United States Patent [19]
Schultz

[11] Patent Number: 4,840,015
[45] Date of Patent: Jun. 20, 1989

[54] METHOD OF CONTINUOUSLY PROCESSING AND PACKING ELONGATED ARTICLES SUCH AS COHERENT PAIRS OF CHOPSTICKS AND AN APPARATUS FOR CARRYING OUT THE METHOD

[75] Inventor: Gert Schultz, Hillerød, Denmark

[73] Assignee: Stormax International A/S, Herley, Denmark

[21] Appl. No.: 150,415

[22] PCT Filed: May 21, 1987

[86] PCT No.: PCT/DK87/00058
§ 371 Date: Mar. 24, 1988
§ 102(e) Date: Mar. 24, 1988

[87] PCT Pub. No.: WO87/07204
PCT Pub. Date: Dec. 3, 1987

[30] Foreign Application Priority Data

May 30, 1986 [DK] Denmark .......................... 2564/86

[51] Int. Cl.[4] .......................... A01C 15/04; B27C 9/00; A47J 49/02

[52] U.S. Cl. .......................... 53/435; 53/447; 53/461; 144/3 R; 144/3 E; 144/134 R; 144/134 E; 144/242 D; 144/242 E; 144/242 M; 144/245 R; 144/192; 144/367; 144/368

[58] Field of Search .......... 144/2 R, 3 R, 3 E, 134 R, 144/134 E, 242 R, 242 D, 242 E, 242 M, 245 R, 245 D, 192, 193 R, 367, 368; 53/203, 435, 447, 461, 522, 540

[56] References Cited

U.S. PATENT DOCUMENTS 1,985,462 12/1934 Schapiro .......................... 144/192

FOREIGN PATENT DOCUMENTS 3116293 6/1980 Fed. Rep. of Germany .

*Primary Examiner*—W. Donald Bray
*Attorney, Agent, or Firm*—Pollock, Vande Sande & Priddy

[57] ABSTRACT

A method and an apparatus for continuously processing and packing elongated articles such as coherent pairs of chopsticks include continuously advancing the articles in the longitudinal direction in a track and centrally aligning the same during the continued advancement. The alignment is performed during the processing by means of one or more processing implements by means of uniform centering rolls operating from their respective sides of the plane of symmetry of the articles. These centering rolls are biased by a uniform spring tension. Subsequently the articles are continuously advanced in the transverse direction by means of transverse conveyor means to a bundling device. In the bundling device the articles are situated in layers and collected in a bundle of articles subsequently wrapped in a sheet material in a wrapping device.

12 Claims, 5 Drawing Sheets

METHOD OF CONTINUOUSLY PROCESSING AND PACKING ELONGATED ARTICLES SUCH AS COHERENT PAIRS OF CHOPSTICKS AND AN APPARATUS FOR CARRYING OUT THE METHOD

TECHNICAL FIELD

The invention relates to a method of continuously processing and packing elongated articles such as coherent pairs of chopsticks, the outer shape of which is defined by two mutually parallel surfaces and two opposing surfaces inclining towards one another by the same inclination relative to a common plane of symmetry. The invention further relates to an apparatus for carrying out the method.

BACKGROUND ART

Every day large amounts of wooden disposable chopsticks are used all over the world. Some of these disposable chopsticks are manufactured in coherent or interconnected pairs, said coherence only extending along a short portion of abutting surfaces. When the chopsticks are to be used the coherent portion is forced apart. Such chopsticks are cut by means of generally known machinery in such a manner that they are formed as elongated articles, the outer shape of which is defined by two mutually parallel surfaces and two opposing surfaces. The latter two opposing surfaces are inclined towards one another by the same inclination relative to a common plane of symmetry. The articles are cut through in said plane of symmetry, leaving a short uncut portion at the thickest end. The finishing of these articles so as to make them ready for use with bevelled edges is difficult and time-consuming. In addition, the bundling of the finished pairs of chopsticks so as to prepare them for dispatch is time-consuming.

DESCRIPTION OF THE INVENTION

The object of the invention is to provide a method and an apparatus to allow a continuous and consequently quick and inexpensive processing and packing of the articles.

The method according to the invention is characterised in that the articles are continuously advanced in the longitudinal direction in a track and are aligned centrally in the track during further advancement while they pass one or more processing implements by means of uniform centering rolls operating from the respective sides of said plane of symmetry of the articles. The centering rolls are biased by a uniform spring tension, and the articles are subsequently advanced continuously in the transverse direction and situated in layers in a bundle of articles, said bundle subsequently being wrapped in a sheet material.

In this manner quick and efficient processing, bundling, and packing of the articles are achieved in a continuous manner, which is further enhanced due to the fact that the processing implements can be used during advancement of the articles. To advance the articles are aligned relative to the processing implements by means of the centering rolls. The continuous bundling of the gradually finished articles is an important step of the quick completion of packed bundles of articles, whereas the actual wrapping of the bundles of articles in a sheet material is performed by means of known equipment.

An apparatus for carrying out the method according to the invention is characterised in that it comprises a longitudinal, substantially horizontal track guiding the articles during their continuous passage through the apparatus, the plane of symmetry of said articles being situated along the vertical central plane of the track, conveyor means are used to advance the articles through the track, and implements would process the articles during their passage along the track. The apparatus futher comprises uniform centering rolls operating from their respective sides of the track and towards the center thereof, said centering rolls being biased by a uniform spring tension and engaging the articles so as to align them during the processing procedure by means of the implements. The apparatus also comprises, stopping means stopping the advancement of the articles and transferring them to transverse conveyor means, transferring means transferring the articles from the transverse conveyor means to a bundling device, and further conveyor means carrying bundles of articles to a wrapping device wrapping said bundles in sheet material. The resulting apparatus allows both quick and continuous processing of the articles and the succeeding bundling and wrapping procedure.

According to the invention the conveyor means may comprise a first set and a second set of endless conveyor means succeedingly engaging the articles from the top side and the bottom side, respectively, of the track, and the centering rolls may comprise a pair of centering rolls associated with each set of conveyor means, said pair of centering rolls influencing the articles from their respective side in a substantially horizontal plane. The processing implements may comprise a rotating milling cutter associated with each pair of centering rolls and processing the articles in their plane of symmetry and furthermore influencing said articles on the side of the articles opposing the set of conveyor means in question, each centering roll of one pair of centering rolls being associated with a pair of coaxially placed rotating milling cutters processing the longitudinal rims of the articles. In this manner the apparatus is particularly suited for ensuring the bevelling of all longitudinal sides of two coherent chopsticks, the rotating milling cutters operating in the plane of symmetry ensuring the bevelling along the abutting edges of the chopsticks while the milling cutters placed coaxially to said one pair of centering rolls are bevelling the longitudinal edges farthest from the plane of symmetry.

Furthermore, according to the invention, the stopping means may comprise two rotating cam discs situated atop one another and rotated synchronously with the first and the second set of conveyor means. The cam discs comprise surfaces closing from each side about the singly continuously advanced articles and the articles are displaced in parallel during the continued rotation onto the transverse conveyor means. In this manner the processed articles are efficiently stopped and subsequently situated on the transverse conveyor means. Moreover, according to the invention, the transferring means may be two rotating worms situated opposite the path of each article end at a vertical run of the transverse conveyor means, whereby the worms comprise mutually parallel and horizontal axes and engage their respective ends of the articles so as to displace said articles in parallel singly away from the transverse conveyor means, the articles being supported by horizontal guiding means during the parallel displacement. In this manner the articles are removed from the transverse conveyor means in a simple manner and with a predetermined mutual distance and an exact guiding.

According to the invention the bundling device may comprise two parallel and substantially horizontally situated rollers provided with longitudinal grooves and situated opposite and parallel to the rotating worms. Furthermore the bundling device may be adapted by stepwise synchronized rotation in opposite direction to situate a groove on each roller directly opposite one another and opposite the feeding path of the article ends during the displacement by means of the worms. As a result an efficient device which receives the articles as they are delivered from the worms and collects said articles in a layer of articles is obtained. The latter layer is displaced as a unit perpendicular to the common plane of the rollers at the stepwise advancement of a new set of grooves when a layer of articles has been completed. Furthermore, according to the invention, the rollers may be hollow at least at the ends adjacent the worms, and the grooves may be bottomless at the ends adjacent the worms. Threadless front parts of the worms project into the rollers and at least partially form the bottom of the grooves aligned with the feeding path of the articles as a consequence of the worms being excentrically mounted relative to the rollers. In this manner a smooth transfer of the movement of the articles from the worms to the rollers is ensured.

Finally according to the invention the rollers may be axially reciprocating away from the threads of the worms during the stepwise rotation of the rollers. In this manner the rollers can perform the stepwise rotation in spite of the articles being advanced to the rollers at a high speed, because the axial returning allows succeeding articles to slide off the end of the rollers during the rotation until they can slide into succeeding grooves.

BRIEF DESCRIPTION OF THE DRAWING

The invention will be described in more detail below with reference to the accompanying drawings, in which.

DESCRIPTION OF THE PREFERRED EMBODIMENTS OF THE INVENTION

Figure 1:
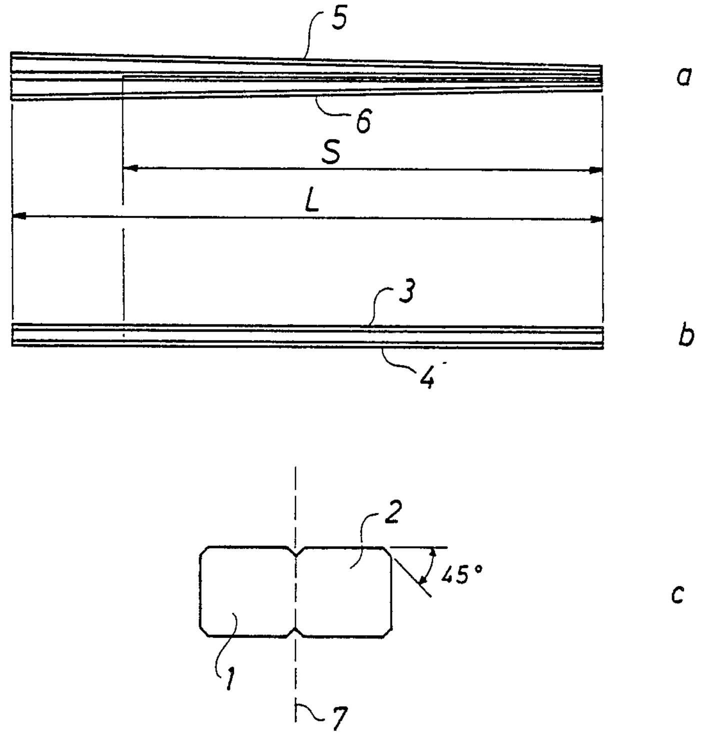
FIGS. 1*a*, 1*b*, and 1*c* are top, side, and end view, respectively, of a set of completed coherent chopsticks, said end view being seen from the thickest end.

The set of chopsticks of FIG. 1 comprises two coherent chopstics 1 and 2 manufactured in advance and cut of a suitable wooden material. The chopsticks are defined by two parallel surfaces 3 and 4 as well as by two surfaces 5 and 6 inclining towards one another by the same inclination relative to a centrally situated plane of symmetry. The plane of symmetry is indicated by dotted lines 7 in FIG. 1*c* and extends in the longitudinal direction of the chopsticks. The sticks are cut through over a length S in the plane of symmetry, said length S corresponding to a considerable portion of the total length L of the sticks. By the method and the apparatus described infra the chopsticks are subjected to a processing whereby all the longitudinal edges are provided with bevelling, such as shown in FIG. 1. When the chopsticks are to be used they are easily taken apart.

Figure 2:
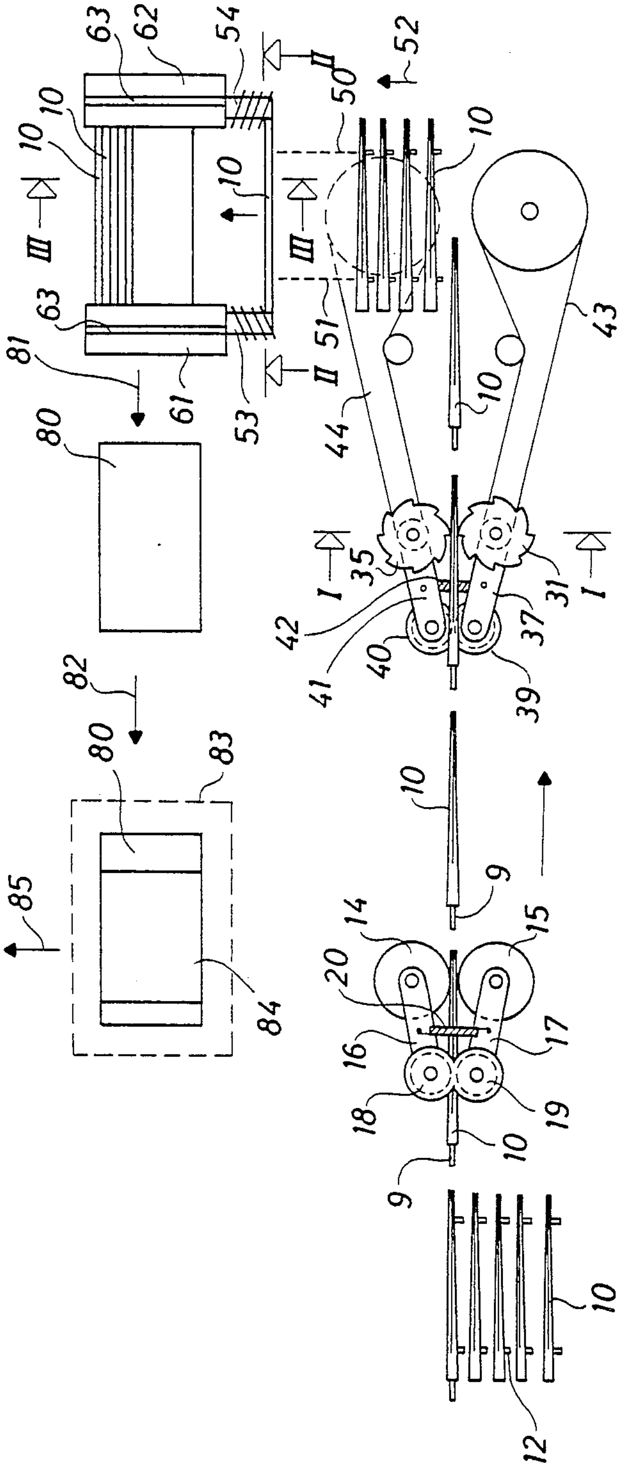
FIG. 2 is a diagrammatic top view of an apparatus according to the invention, showing the various steps of a method according to the invention.
Figure 3:
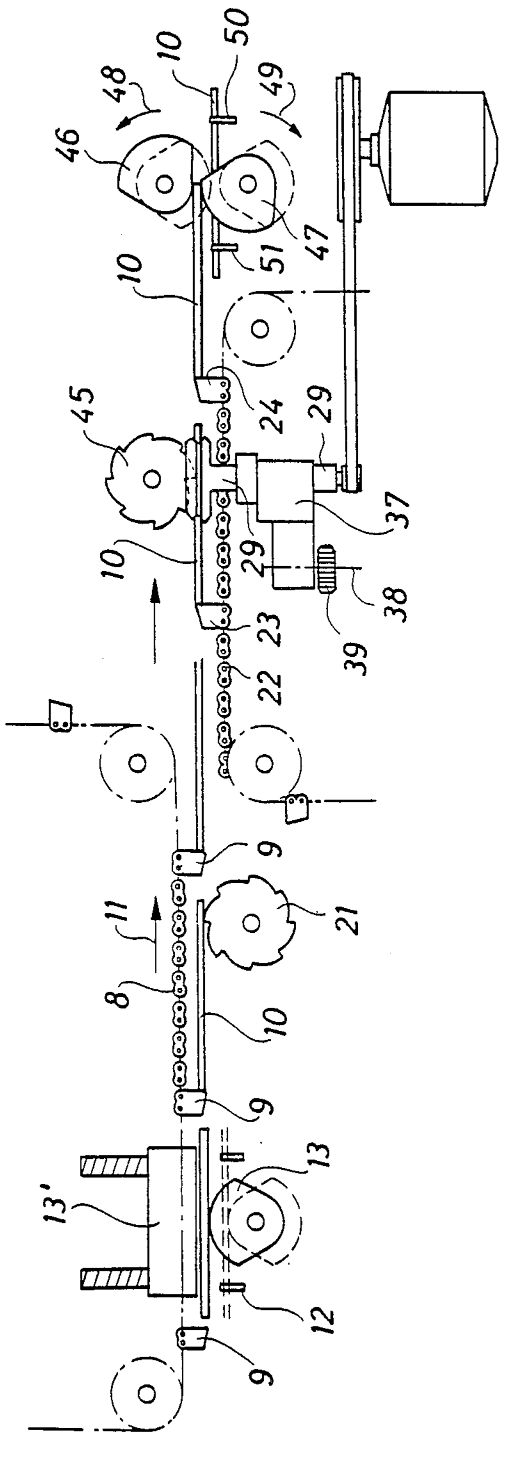
FIG. 3 is a side view of the apparatus of FIG. 2 without the bundling device and the wrapping device.
Figure 4:
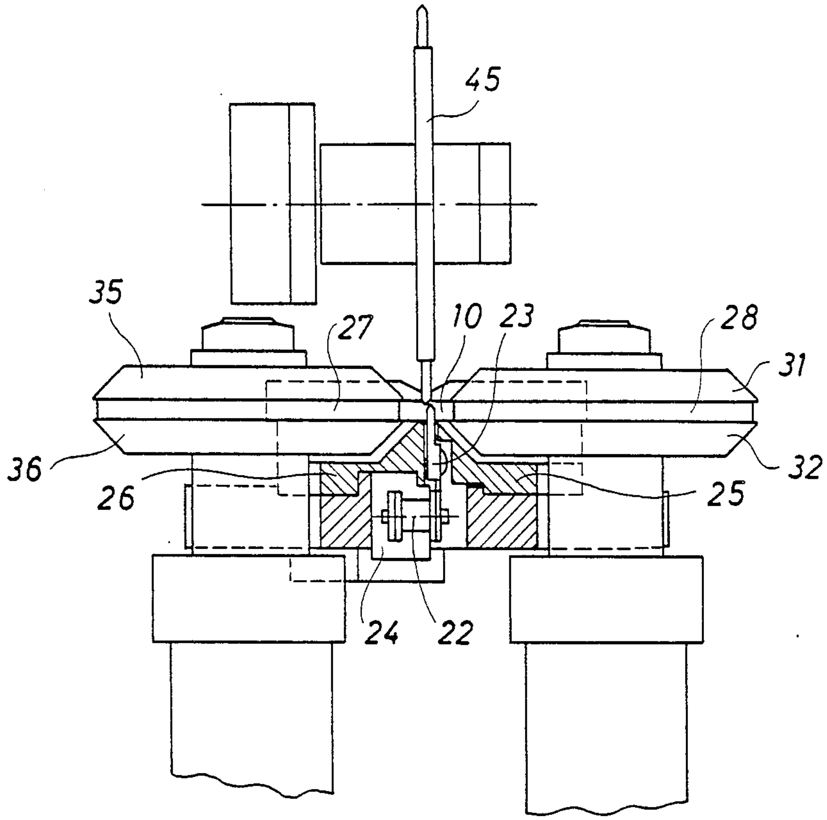
FIG. 4 is an enlarged diagrammatic, sectional view taken along the line I—I of FIG. 2 of two sets of individually coaxially mounted centering rolls and two edge milling cutters, whereby parts have been omitted for the sake of clarity.

The apparatus of FIGS. 2 and 3 comprises a first set of endless conveyor means in the form of a chain 8. At suitable intervals the chain activates dogs 9 to engage they respective articles 10 including two coherent chopsticks 1 and 2. Within a horizontally extending length of the chain 8 the dogs 9 engage the respective articles 10 and advance said article in the direction indicated by an arrow 11. The dogs 9 engage the articles opposite a set of transverse conveyor means 12, said conveyor means only being diagrammatically illustrated. Then the articles are continuously advanced on said conveyor means 12 until they are opposite the chain 8 where they, by means of a cam disc 13, are forced upwardly into abutment with a biased top guide 13′ passed by the chain 8 with the dogs 9 projecting downwards through a narrow slot (not shown). The dogs 9 displace the articles 10 into a longitudinal track (not shown in FIGS. 2 and 3) in the apparatus, the articles being guided in said track during the following processing. The track is indicated in FIG. 4 and is an upwardly open channel slightly greater in cross section than the broadest cross section of the articles. During the advancement the dog 9 of the chain 8 moves the articles 10 past a first set of uniform centering rolls 14 and 15 pressing from their respective sides about the articles during the passage thereof. These rolls are pivotally mounted on their respective arm 16 and 17, respectively. At the end opposite the end carrying the centering rolls these arms are each secured to a gear wheel 18 and 19, respectively, engaging one another and pivotally mounted in a manner not shown about vertical parallel axes within the apparatus. The mutual engagement of these gear wheels 18 and 19 and the permanent connection to the arms 16 and 17 imply that the centering rolls 14 and 15 are always ensured the same angular deflection relative to a central line coinciding with the advancing direction of the articles. The two arms 16 and 17 are interconnected by means of a biasing spring 20, which ensures that the centering rolls 14 and 15 follow the outer contour of the articles everywhere irrespective of possible irregularities.

A rotating vertically situated milling cutter 21 is provided on the side of the articles not facing the conveyor chain 8 and at the same place as the rolls 14 and 15 engage said articles. The milling cutter is rotated about a horizontal axis and mills a longitudinal centrally situated groove along one downwardly turned side of the articles, i.e. in the plane of symmetry of the articles, while said articles pass the rolls 14 and 15. The milling cutter 21 appears from FIG. 3 but has been omitted from FIG. 2 for the sake of clarity.

When the articles have passed the milling cutter 21 the advancement of the articles is taken over by a second set of endless conveyor means in the form of a chain 22 carrying dogs 23, said dogs 23 engaging the articles from the bottom side of the track (not shown in FIGS. 2 and 3). A single link of the chain 22 with the dog 23 engaging the rear end of an article 10 appears from the sectional view of FIG. 4. The chain 22 is guided in a manner known per se in a suitable groove in a plastic member 24 mounted below the track of the apparatus. In FIG. 4 the track of the apparatus is defined by longitudinal strips 25 and 26 extending in the longitudinal direction of the track. On the location of the section shown in FIG. 4 the strips are, however, provided with recesses in order to make room for milling cutters and centering rolls described in greater details below.

Figure 5:
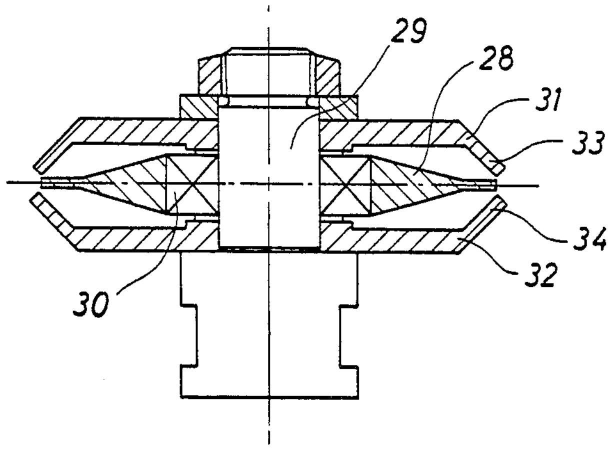
FIG. 5 is an enlarged axial sectional view through one set of the coaxially mounted edge milling cutters and a centering roll.

During the advancement by means of the chain 22 the articles pass a set of uniform centering rolls 27 and 28 operating from their respective sides and only diagrammatically indicated in FIG. 4. FIG. 5 is an axial sectional view through the centering roll 28 with associated parts. As illustrated in the said FIG. 5 the centering roll 28 is pivotally mounted about a shaft 29 by means of a ball bearing 30. An edge milling cutter 31 (and 32) is secured coaxially on the shaft 29 on each side of the centering roll 28. This edge milling cutter comprises knives 33 and 34, respectively, projecting towards the periphery of the centering roll 28 and bevelling their respective edge on the passing article at a driven rotation of the shaft 29. Correspondingly the second centering roll 28 is surrounded by edge milling cutters 35 and 36, cf. FIG. 4. But as the edge milling cutters and the associated centering roll are identical on each side of the feeding path of the articles in the track, only one set has been described here. As illustrated in FIG. 3 the shaft 29 of the milling cutter is mounted in an arm 37 in turn pivotally mounted about an axis 38 and secured to a gear wheel 39. This gear wheel engages a corresponding gear wheel 40, cf. FIG. 2, associated with an arm 41, which supports the second set of edge milling cutters 35 and 36 with the corresponding centering roll 27. The arms 37 and 41 are interconnected by means of a biasing spring 42 forcing the arms 37 and 41 against each other. Thus the sets of edge milling cutters 31, 32 and 35, 36 with associated centering rolls 28 and 29 operate in the same manner as described above in connection with the centering rolls 14 and 15. The coaxial positioning of the milling cutters relative to the associated centering rolls 27 and 28 implies that the edge milling cutters cuts alike portions everywhere of the edges in question of the articles, disregarding whether the outer contour thereof varies irregularly or not in the longitudinal direction.

The shafts such as the shaft 29 of the edge milling cutters are activated by means of their respective belt drives 43 and 44 indicated in FIG. 2. A second vertical milling cutter 45 of the same type as the milling cutter 21 shown above is situated in the plane of symmetry of the articles on the side of the articles 10 not facing the chain 12, cf. FIGS. 3 and 4. This edge milling cutter 45 engages the advanced articles at the same time as said articles engage the above edge milling cutters 31, 32, and 35, 36 with the associated centering rolls 28 and 27. The vertical milling cutter 45 ensures formation of a longitudinal groove in the article on the side not facing the chain 22.

Having passed the latter milling cutters, all the edges of the coherent sticks 1 and 2 have been bevelled, FIG. 1. The desired processing has therefore been completed and the articles 10 are carried out of the track at a relatively high speed. At the end of the track the articles 10 are caught and stopped by means of two cam discs 46, 47 activated mutually synchronously and synchronously with the advancement. In the drawing said cam discs are shown in the catching position by means of solid lines. The cam discs are rotated in the directions indicated by means of the arrows 48 and 49, respectively, and during said rotation they carry the collected articles slightly downwards, FIG. 3, so as to be situated on a transverse conveyor. This conveyor comprises two endless and only diagrammatically shown conveyor chains 50 and 51 supporting the articles adjacent their respective end. On these chains 50 and 51 the articles are horizontally advanced in the direction indicated by means of an arrow 52 in FIG. 2. The processing of the articles can, if desired, be controlled during this movement by means of control equipment (not shown), thus ensuring removal of possibly worthless articles.

Figure 7:
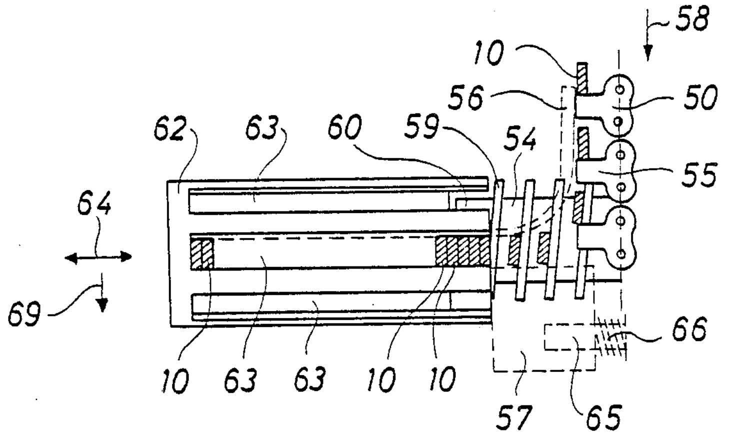
FIG. 7 is a sectional view taken along the line III—III of FIG. 2.

Having followed the above horizontal track, the articles 10 are then carried vertically downwards in the direction indicated by an arrow 58 in FIG. 7. A worm 53 and 54 is situated opposite the path of each end of the articles and at a suitable level during the latter downward movement. The axes of rotation of these worms are mutually parallel and extend horizontally perpendicular to the vertical advancing path of the articles. The worms are rotated in a manner (not shown) in opposing directions. During this rotation the worms displace the articles away in parallel from the engagement with the dogs 55 of the conveyor chains 50 and 51, cf. the dotted indication in FIG. 7. In addition during this rotation the articles are kept correctly positioned by means of the guide 56 indicated by dotted lines in FIG. 7.

Figure 6:
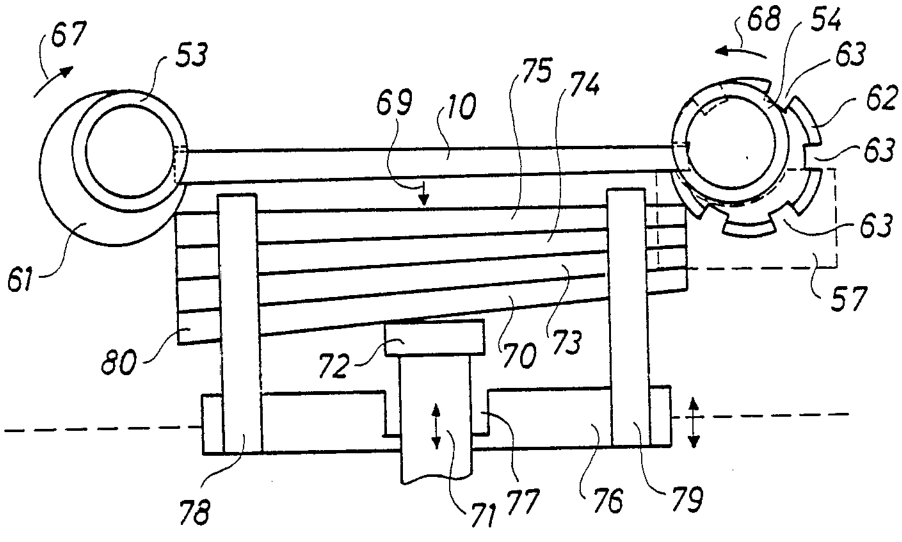
FIG. 6 is a view taken along the line II—II of FIG. 2.

Shortly after having disengaged the chains 50 and 51 the articles are placed on top of control blocks, only one block 57 appearing by means of dotted lines both in FIG. 6 and in FIG. 7. Each worm is associated with such a control block. As indicated in FIG. 7, the threads 59 of the worms end a distance from the front ends 60 of the worms seen in the advancing direction. These threadless ends 60 of the worms 53 and 54 project into adjacent ends of parallel rollers 61 and 62 eccentrically situated relative to the associated worms 53 and 54, cf. FIG. 6. The rollers 61 and 62 are provided with axially extending grooves 63 mutually spaced by the same intervals along the periphery of the rollers 61 and 62. FIG. 6 illustrates the grooves 63 only in connection with the roller 62.

As particularly illustrated in FIG. 7 the rollers 62 are hollow at the ends abutting the worms 53 and 54 in such a manner that the grooves 63 are bottomless over a length corresponding to the length of the threadless front ends 60 of the worms 53 and 54.

As illustrated in FIG. 7 the articles 10 are advanced along the upper surfaces of the control blocks 57 and directly into a groove 63 opposing said surfaces. The groove is situated in the rollers 61 and 62 at each end of the articles. As new articles are advanced the articles are pushed more and more into the grooves 63 until the two opposing grooves have been filled with articles, cf. the indication in FIG. 7. Now a counter signals an activation of the rollers 61 and 62 to make them carry out a short rotating movement in opposite directions until a new set of grooves 63 opposes the upper surface of the control blocks 57. As the advancement of new articles from the worm is continued during this rotation, the rollers are axially displaced too, cf. the double-arrow 64 of FIG. 7. As a result the rollers can slide off resiliently along forwardly facing sides of freshly advanced articles until the succeeding grooves oppose said new articles and can receive them. As the grooves 63 are provided with bottomless portions and as the worms are eccentrically placed relative to the rollers in such a manner that the threadless portions tightly abut the rollers just inside the groove ready to receive the articles, it is possible to guide the advancing articles during the rotation of the rollers so that they are able to enter the bottomless end of a freshly advanced groove 63 and to be advanced in said groove 63 without obstacles.

In order to ensure that freshly advanced articles are guided from below during the rotation of the rollers 61 and 62 as well, the control blocks 57 follow the axial movement of the rollers. The latter is ensured by the control blocks being displaceably mounted on pins 65, only one pin being indicated in FIG. 7, and being biased by means of a spring 66 towards the end of the associated roller.

The articles 10 filling two opposing grooves 63 in the rollers 61 and 62 form a layer of a bundle of articles, said bundle being desired for a succeeding wrapping procedure. During each rotation of the rollers 61 and 62 a new layer of articles is carried vertically downwards in the direction indicated by an arrow 69 in FIGS. 6 and 7, said rotation of the rollers being indicated by the arrows 67 and 68. A vertically displaceable bottom guide 71 is provided immediately below a first layer 70 of articles. This bottom guide comprises a horizontal leg 72 extending below the entire layer 70 so as to support each articles 10 of said layer 70. As new layers 73, 74, and 75 are advanced the resilient bottom guide is displaced more and more downwards. The resilience of the bottom guide 71 has been provided by means of a weak air cylinder not shown. When a desired number of layers 70, 73, 74, and 75 is present a sensor ensures that the bottom guide 71 is moved downwards until the resulting bundle of articles rests on an elevator 76 while the horizontal leg 72 of the bottom guide 71 is received in a recess 77. Now two pairs of squeezing means 78 and 79 at each end of the layers of articles are activated so as to squeeze the layers together because the pairs are moved towards one another perpendicular to the articles of the layers. Subsequently or simultaneously the elevator 76 is moved downwards for transferring the bundle of articles to a horizontal conveyor. This conveyor carries the bundle 80 of articles from the elevator 76 horizontally to the wrapping device 83 in the direction indicated by means of arrows 81 and 82 in FIG. 2. The wrapping device is of a generally known type and therefore only diagrammatically shown in FIG. 2. The wrapping device ensures that the bundle 80 of articles is wrapped in a suitable sheet material 84 so as finally to be discharged ready for dispatch, as indicated by means of an arrow 85.

When the bundle 80 of articles 10 has been removed from the elevator 76, said elevator is returned to its starting position, and the bottom guide 71 is simultaneously carried to the new layer of articles 10 appearing between the worms.

The invention has been described above with reference to a preferred embodiment thereof. Many modifications can, however, be carried out without thereby deviating from the scope of the invention.

I claim:

1. A method of continuously processing and packing elongated articles such as coherent pairs of chopsticks the outer shape of which being defined by two mutually parallel surfaces and two opposing surfaces inclining towards one another by the same inclination relative to a common plane of symmetry, the method comprising the steps of:

continuously advancing the articles along a track in the longitudinal direction of the articles;

centrally aligning the articles in the track during further advancement while the articles pass by at least one processing implement by means of uniform centering rolls operating from the respective sides of said plane of symmetry of the articles, said centering rolls being biased towards the track by a uniform spring tension effected by spring means;

subsequently advancing the articles continuously in the transverse direction;

situating the articles in layers in a bundle of articles; and subsequently wrapping said bundle in a sheet material.

2. A method as claimed in claim 1, wherein the articles are advanced in the transverse direction by means of two endless conveyor means extending in parallel and supporting respective ends of the articles; and wherein the articles are removed from said conveyor means and transferred to a bundling device by means of two continuously operating worms engaging the respective ends of the articles and removing said articles perpendicularly from the two endless conveyor means.

3. A method as claimed in claim 2, wherein the respective ends of the articles are transferred from the worms to corresponding grooves in two rollers situated on each side of the track of the articles, a desired number of the articles being placed by the grooves as a layer of articles in the bundle of articles therebelow by a mutually opposite turning of the rollers at the same time as a new set of grooves in the rollers are advanced to receive another layer of articles.

4. An apparatus for continuously processing and packing elongated articles such as coherent paris of chopsticks the outer shape of which being defined by two mutually parallel surfaces and two opposing surfaces inclining toward each other by the same inclination relative to a common plane of symmetry, the apparatus comprising:

a longitudinal, substantially horizontal track guiding the articles during their continuous passage through the apparatus, the plane of symmetry of said articles being situated along the vertical central plane of the track;

conveyor means advancing the articles through the track;

implements processing the articles during their passage along the track;

uniform centering rolls operating from respective sides of the track and towards the center thereof, said centering rolls being biased towards the tracks by a uniform spring tension effected by spring means for engaging the articles into alignment during the processing procedure by means of the implements;

stopping means stopping the advancement of the articles and transferring the same to transverse conveyor means;

transferring means transferring the articles from the transverse conveyor means to a bundling device;

further conveyor means carrying bundles or articles to a wrapping device wrapping said bundles in sheet material.

5. An apparatus as claimed in claim 4, wherein the conveyor means comprises a first set and a second set of endless conveyor means succeedingly engaging the articles from the top side and the bottom side, respectively, of the track; and wherein the centering rolls comprise a pair of centering rolls associated with each set of conveyor means, said pair of centering rolls influencing the articles from their respective sides in a substantially horizontal plane; and wherein the processing implements comprise a rotating milling cutter associated with each pair of centering rolls and processing the articles in their plane of symmetry and furthermore influencing said articles on the side of the articles opposing the set of conveyor means in question, each centering roll of one pair of centering rolls being associated with a pair of coaxially placed rotating milling cutters for processing the longitudinal rims of the articles.

6. An apparatus as claimed in claim 4, wherein the stopping means comprise two rotating cam discs situated atop one another and rotate synchronously with the first and the second set of conveyor means, said cam discs comprising surfaces closing from each side about each of the continuously advancing articles for displacing the articles in parallel during the continued rotation onto the transverse conveyor means.

7. An apparatus as claimed in claim 4, wherein the transverse conveyor means comprises two endless conveyor chains extending in parallel for supporting and engaging the respective ends of the adjacent articles.

8. An apparatus as claimed in claim 4, wherein the transferring means are two rotating worms situated opposite the paths of respective ends of each article at a vertical run of the transverse conveyor means, whereby the worms comprise mutually parallel and horizontal axes and engage the respective ends of the articles to displace in parallel said articles singly away from the transverse conveyor means, the articles being supported by horizontal guiding means during the parallel displacement.

9. An apparatus as claimed in claim 8, wherein the bundling device comprises two parallel and substantially horizontally situated rollers provided with longitudinal grooves and situated opposite and parallel to the rotating worms; and wherein the rollers, by stepwise synchronized rotation in opposite direction, position respective grooves on each roller directly opposite one another and opposite the feeding path of the respective ends of each article during the displacement thereof by means of the worms.

10. An apparatus as claimed in claim 9, wherein the rollers are hollow at least at the ends adjacent the worms, the grooves being bottomless at the ends adjacent the worms, threadless front parts of the worms projecting into the rollers, said parts at least partially forming the bottom of the grooves aligned with the feeding path of the articles as a consequence of the worms being eccentrically mounted relative to the rollers.

11. An apparatus as claimed in claim 9, wherein the rollers are axially reciprocating away from the threads of the worms during the stepwise rotation of the rollers.

12. An apparatus as claimed in claim 4, wherein the bundling device comprises vertically displaceable supporting means collecting the layers of articles during the establishment of a bundle, said supporting means delivering the bundles of articles to the conveyor means communicating with the wrapping device when a bundle is ready for further advancement in the apparatus.

* * * * *